United States Patent [19]

Dey et al.

[11] 4,331,743
[45] May 25, 1982

[54] METHOD FOR INCREASING RECYCLING LIFE OF NON-AQUEOUS CELLS

[75] Inventors: Arabinda N. Dey, Needham, Mass.; William L. Bowden, Nashua, N.H.

[73] Assignee: Duracell International Inc., Tarrytown, N.Y.

[21] Appl. No.: 182,912

[22] Filed: Sep. 2, 1980

[51] Int. Cl.³ ........................................... H01M 10/44
[52] U.S. Cl. ....................................... 429/50; 429/196
[58] Field of Search ................ 429/50, 196, 194, 199, 429/49

[56] References Cited

U.S. PATENT DOCUMENTS

| | | | |
|---|---|---|---|
| 793,881 | 7/1905 | Kitsee | 429/49 |
| 4,020,240 | 4/1977 | Schlaikjer | 429/196 |
| 4,139,680 | 2/1979 | Schlaikjer | 429/196 |

*Primary Examiner*—Donald L. Walton
*Attorney, Agent, or Firm*—Ronald S. Cornell; Israel Nissenbaum

[57] ABSTRACT

A method for increasing the recycling life of an electrochemical cell containing a lithium (or other active metal subject to dendritic plating) anode and a clovoborate salt or other salt, which forms soluble oxidizing agents at elevated charging voltages, comprising the step of charging the cell at a potential above normal charging voltage whereby said soluble oxidizing agents are formed.

16 Claims, No Drawings

METHOD FOR INCREASING RECYCLING LIFE OF NON-AQUEOUS CELLS

This invention relates to rechargeable non-aqueous electrochemical cells and more particularly to such cells containing lithium anodes, sulfur dioxide cathode depolarizer/electrolyte solvents and clovoborate electrolyte salts.

In U.S. Pat. No. 4,139,680 issued on Feb. 13, 1979 to Carl R. Schlaikjer and assigned to the same assignee of the present invention, the use of a clovoborate electrolyte salt is described as being beneficial for rechargeable cells. These clovoborate salts are described therein as having an anion with a closed cage formation with the general formula $(B_m X_n)^{-k}$ wherein B is the element boron and m, n and k are integers and X is selected from a wide range of elements which may also include organic groups alone or in combination. Particular salts having utility in the rechargeable cells included those having X as being selected from the halogens (F, Cl, Br and I), hydrogen and OH alone or in combinations, with some halogens being preferred as part of the X substituent. Preferably m and n in the formula are integers selected from the group 6–20 for m and 6–18 for n. Most preferably m and n are 6, 9, 10, 11 or 12. Generally both m and n are the same but in some cases they may differ because of cage linkups. The interger k may range from 1–4 but is preferably 2. As a single embodiment a preferred composition is where X is chlorine, m and n are both 10 and k is 2. Specific lithium clovoborate salts useful as electrolyte salts which are known and characterized in the chemical literature include $Li_2B_{10}Cl_{10}$, $Li_2B_{10}Br_{10}$, $Li_2B_{12}Cl_{12}$, $Li_2B_{12}I_{12}$, $Li_2B_6Br_6$, $Li_2B_9Cl_9$, $Li_2B_{12}Br_8F_4$, $Li_2B_9Cl_8H$, $Li_2B_9Br_6H_3$, $Li_2B_{11}Br_9H_2$, $Li_2B_{12}H_8F_4$, $Li_2B_{12}H_7F_5$, $Li_2B_{12}H_6F_6$ and $Li_2B_{12}F_{11}OH$. The cation associated with the clovoborate anion is generally the same metal utilized as the cell anode. The anode metals utilized in such cells are the active metals particularly alkali and alkaline earth metals with the most utilized ones being lithium and sodium.

The clovoborate salts are described as being highly soluble and conductive in inorganic solvents such as $SO_2$ (conductivity on the order of $1.4$–$2.4 \times 10^{-2}$ ohm$^{-1}$cm$^{-1}$ at temperatures between $-20°$ to $70°$ C.) without the necessity for organic cosolvents which are normally required for adequate electrolyte solvation such as in $Li/SO_2$ cells.

The clovoborate salts are further described as having the beneficial effect of reducing or eliminating dendritic plating of the anode metal on recharging with resultant increased longevity of the cell and increased cycling efficiency. In fact, it has generally been considered essential to reduce such dendritic plating in order to obtain a commercially viable rechargeable non-aqueous cell. Various other expedients previously used included additives and anode metal alloys with varying degrees of success. The dendrites because of their fragile nature and tenuous electrical connection to the anode are highly susceptible to mechanical dislodgement and electrical separation from the anode substrate with the result that the anode metal contained therein is lost from further cycling. Though the use of clovoborate electrolyte substantially reduces the amounts of dendritic plating there still remains some residual minimal amounts of dendritic plating which over repeated cycles may cause anode metal loss.

It is an object of the present invention to provide a method whereby the recycling life of cells having even reduced dendritic plating is further improved.

Generally the present invention comprises a method for extending the recycling lifetime of non-aqueous cells containing lithium (or other active metals which are susceptible to dendritic plating) and clovoborate salts (or other salts which form soluble oxidizing agents at elevated voltages) by recharging such cells at voltages above those normally required for the electrochemical recharging. The required voltage in cells with clovoborate salts therein is generally above 3.5 volts. It is believed that at such higher voltages the clovoborate salt anion is converted at the cathode into a soluble clovoborate anion generated moiety having anode metal scavenging properties whereby electrically disconnected anode metal is scavenged by such moiety and returned to the electrolyte solution as a soluble cation for further cycling. It is postulated that the soluble clovoborate anion generated moiety scavenges the anode metal, normally lost from cell recycling, from even the minimal electrically disconnected dendrites. Additionally it is further postulated that the soluble clovoborate anion generated moiety also scavenges anode metal which is contained in insoluble reaction products of the electrolyte solvent and the anode metal and in the cell reaction product at the cathode. Thus, for example in a cell containing a lithium anode, a sulfur dioxide electrolyte solvent/cathode depolarizer, a $Li_2B_{10}Cl_{10}$ electrolyte salt and a porous carbon cathode the following situation is believed to occur.

Lithium dithionite ($Li_2S_2O_4$) is the spontaneous insoluble reaction product on the lithium anode surface and is the cell reaction product during cell discharge. During charging of the cell, the lithium dithionate reaction product is electrochemically reversed into the lithium and $SO_2$ reactants at an applied voltage between about 3.25 and 3.5 volts. In charging cells it has generally been desirable to provide voltage cutoffs at a voltage just above that required for the electrochemical reversal, in order to minimize heat generation, cell degradation and other untoward effects caused by the higher voltages. Accordingly it has not been generally desirable to charge $Li/SO_2$ cells at voltages above 3.5. Additionally, at the lower voltages the clovoborate salts were found to be desirably stable and did not appear to take part in the cell reaction, thereby providing another reason for maintaining lower charging voltages. However it was discovered that when the cell is charged at voltages above 3.5 volts and more particularly at about 3.8 volts, though the clovoborate salt becomes unstable, it is to a beneficial effect, with the generation of anode metal scavengers. The scavenging clovoborate anion generated moieties are formed at the cathode and thereafter diffuse through the electrolyte to scavenge electrically disconnected anode metal and anode metal-solvent products at the anode site as well as insoluble disconnected cell reaction products at the cathode which also contain the anode metal. As evidence of such occurrence it is noted that after charging, at high voltages above 3.5 volts, and immediate discharge thereafter there is a short voltage plateau at 3.7 volts whereas the normal open circuit voltage of the $Li/SO_2$ cell is about 3.0 volts. When the cell is allowed to stand on open circuit for a short period of time after the charging, the voltage plateau disappears on subsequent discharge. Additionally during the charging cycle after repeated cycling two voltage plateaus appear, one at the 3.25–3.5 normal voltage required for electrochemical reversal in the Li/SO$_2$ cell and another at about 3.8 volts. Such behavior is consistent with the postulation that the clovoborate anion is converted to another moiety at the cathode at the higher voltage plateau and which moiety in itself discharges for a short period of time at the high voltage of 3.7 until it, as a soluble species, diffuses from the cathode to the anode.

It is a general requisite that the cell contain a porous cathode with a high surface area such as a porous carbon cathode whereby the conversion of the clovoborate anion may effectively take place. In fact the expanded metal electrode in the aforementioned patent would not have been expected to provide adequate conversion of the clovoborate anion in the formation of scavengers even at elevated charging voltages. Though the clovoborate salt has been described as being an electrolyte salt, the clovoborate salt may also be present in the cell as an addition agent such as in U.S. Pat. No. 4,071,664, also assigned to the present assignee. The formation of the clovoborate anion generated scavenging moieties would similarly occur at the requisite elevated charging voltages.

During charging of the cell it is postulated that the scavenging moieties of for example a $B_{10}Cl_{10}^{-2}$ anion would include a neutral $B_{10}Cl_{10}$ species formed by the electrochemical oxidation, $B_{10}Cl_{10}^{-2} \rightarrow B_{10}Cl_{10} + 2e^-$. The scavenging mechanisms are as follows:

Lithium dendrite scavenging:

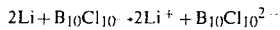

Lithium dithionite scavenging:

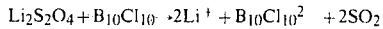

A $B_{10}Cl_{10}$ radical species is also postulated as being formed by the electrochemical oxidation with similar scavenging properties.

In accordance with the above postulation there is a substantially complete regenerative recycling of all of the electrolyte salt, SO$_2$ depolarizer solvent, and the lithium anode metal with even disconnected lithium metal and anode metal containing dithionite being recovered for additional cycling life. Thus the high voltage generated scavenging moieties must be regenerative and not just an irreversible degradation product in order to improve cycling lifetimes.

It is also highly preferred that the cell not contain reactive elements therein which will react to produce reaction products which are not electrochemically reversible to the original starting materials. Thus it is generally preferred that the cell be totally inorganic and should not contain organic solvents or cosolvents as is commonly the case with sulfur dioxide depolarized cells or wherein sulfur dioxide is a solvent. The commonly used organic electrolyte solvents such as propylene carbonate, acetonitrile, tetrahydrofuran, gammabutyrolactone, methyl formate and the like react with the anode metal to form reaction products which are substantially incapable of being reversed into the original starting materials of solvent and anode metal. Though anode metal therein may be recovered, the solvent cannot. Thus upon subsequent recharging cycles there is both a depletion of solvent and an increase of unwanted reaction products, as impurities within the cell, which adversely affect cell life and performance. Since the clovoborate salts provide good conductivity in the SO$_2$ electrolyte without the need for cosolvents it is therefore possible to construct a useful cell without the detrimental organic solvents.

It is also preferred that the cathode depolarizer provide a substantially reversible reaction product with the anode metal. Thus sulfur dioxide which reacts with lithium at the cathode to form the substantially completely reversible lithium dithionite is highly preferred. Less preferred are other cathode depolarizers such as thionyl chloride which forms unstable intermediate reaction species which provide a multitude of reaction products which by their very number preclude the preferred substantially complete reversibility. Nevertheless the present invention will enhance rechargeability of cells containing cathode depolarizers such as the aforementioned thionyl chloride with the enhanced anode metal recycling effected by the anode metal scavengers. Anode metal subject to dendritic plating include the aforementioned lithium and other alkali and alkaline earth metals. Examples of other soluble cathode depolarizers include fluid oxyhalides, non-metallic oxides, non-metallic halides and mixtures thereof such as phosphorous oxychloride (POCl$_3$), selenium oxychloride (SeOCl$_2$), sulfur trioxide (SO$_3$), vanadium oxytrichloride (VOCl$_3$), chromyl chloride (CrO$_2$Cl$_2$), sulfuric oxychloride (SO$_2$Cl$_2$), nitryl chloride (NO$_2$Cl$_2$), nitrosyl chloride (NOCl), nitrogen dioxide (NO$_2$), sulfur monochloride (S$_2$Cl$_2$), and sulfur monobromide (S$_2$Br$_2$). Since the present invention enhances anode metal recovery it is also useful with a variety of solid cathode depolarizers such as metal halides, oxides, chromates, permanganates, periodates, chalcogenides and the like. Particularly useful solid cathode depolarizers are substantially completely reversible intercalation compounds such as TiS$_2$ as described in U.S. Pat. No. 4,009,052 issued to M. Whittingham on Feb. 22, 1977.

The cell of the present invention containing clovoborate salts need not be completely charged at voltages above 3.5 (for an Li/SO$_2$ cell) particularly during initial charging cycles when dendritic deposition is minimal. However, when dendritic depositions increase, the charging voltage should be above 3.5 volts for at least part of each charging cycle and preferably at about 3.8 volts. The cell should preferably not be charged at rates exceeding 4.5 volts in order to preclude overheating of the cell and electrochemical degradation of cell components with detrimental side effects.

The following examples ae presented as exemplifying the present invention and its attendant advantages. Since such examples are for illustrative purposes only, the invention should not be construed as being limited to the specifics described therein. Unless otherwise indicated all parts are parts by weight.

EXAMPLE 1

(PRIMARY CELL DISCHARGE)

A 'D' size cell (O.D. 1.31″(3.3 cm.)×Ht. 2.32″ (5.9 cm)) is constructed with a porous carbon cathode on an expanded aluminum grid (21″ (53.3 cm)×1⅝″ (4.13 cm)×0.025″ (0.064 cm)), a lithium foil cathode of similar dimensions but 0.015″ (0.038 cm) thick, and a porous polypropylene separator therebetween in a spirally wound configuration. The cell is thereafter filled with a 1 N solution of Li$_2$B$_{10}$Cl$_{10}$ in liquid SO$_2$ (about 40 grams) with the completed cell weighing about 88 grams. The open circuit voltage of the cell is 2.9 volts and the current voltage characteristics are as follows:

| Discharge Current (A) | Voltage |
| --- | --- |
| 0 | 2.90 |
| 0.10 | 2.90 |
| 0.20 | 2.90 |
| 0.30 | 2.85 |
| 1.00 | 2.80 |
| 3.00 | 2.78 |
| 5.00 | 2.70 |

The discharge current of 5.0 A corresponds to a power density of 153 W/kg.

The cell is discharged on a constant 0.25 A current to a 2.0 volt cutoff and delivers 10 Ahr. Since the cell is cathode limited (stoichiometric lithium capacity is 17 Ahr and cathode capacity is 10 Ahr) the cell is about 100% efficient and the cell has an energy density of 139 Whr/lb (307 Whr/kg).

EXAMPLE 2

(CHARGING AND DISCHARGING OF CELL)

A cell made in accordance with the cell of Example 1 is cycled on a 10 hour discharge-charge regime at 0.10 A. The cell is charged during the first 25 cycles at voltages between 3.25 and 3.5 volts. Thereafter the charging voltage exceeds 3.5 volts and forms a plateau at about 3.8 volts. The cell provides 123 cycles and delivers a cumulative discharge capacity of 85 Ahr. The cell thus delivers about 8.5 times the capacity of the cell limiting carbon cathode. Cell degradation towards the end of the cycling lifetime is attributable to the degradation of the aluminum substrate in the carbon cathode and not to the loss of dischargeable anode metal.

Other valve metals such as titanium, tantalum, molybdenum and the like may be substituted for the aluminum cathode substrate in providing even longer recycling lifetimes.

The preceding examples were presented as illustrating the present invention and should accordingly not be construed as a limitation thereon. Changes in cell materials, structures and configurations may be made without departing from the scope of the present invention as defined in the following claims.

What is claimed is:

1. A method for improving the cycling life of a rechargeable cell containing an active anode metal subject to dendritic plating on charging, a porous cathode, an electrolyte solvent and a dissolved salt which is stable at charging voltages and capable of forming soluble oxidizing moieties, at higher voltages; which moieties are capable of scavenging and solvating insoluble electrically disconnected anode metal and anode metal in insoluble compounds within said cell and said salt being further capable of being recycled thereby; said method comprising charging said cell at a voltage above said charging voltage and sufficiently high whereby said salt forms said soluble oxidizing moieties at said cathode which scavenge and solvate insoluble electrically disconnected anode metal and anode metal in insoluble compounds with said salt being recycled thereby.

2. The method of claim 1 wherein said salt is a clovoborate salt.

3. The method of claim 2 wherein said clovoborate salt has an anion with the formula $(B_mX_n)^{-k}$ wherein m, n and k are integers with m ranging from 6–20, n ranging from 6–18 and k ranging from 1–4, B is boron and X is selected from the group consisting of H, F, Cl, Br, I, OH and combinations thereof.

4. A method for improving the cycling life of a rechargeable cell containing an active anode metal subject to dendritic plating on charging, a porous cathode, an electrolyte solvent and a dissolved salt which is stable at charging voltages; said method comprising charging said cell at a voltage sufficiently high whereby said salt forms soluble oxidizing moieties at said cathode which scavenge and solvate insoluble electrically disconnected anode metal and anode metal in insoluble compounds with said salt being recycled thereby, wherein said salt is a clovoborate salt which has an anion with the formula $(B_mX_n)^{-k}$ wherein m, n and k are integers with m ranging from 6–20, n ranging from 16–18 and k ranging from 1–4, B is boron and X is selected from the group consisting of H, F, Cl, Br, I, OH and combinations thereof, and wherein said electrolyte solvent consists essentially of $SO_2$.

5. The method of claim 4 wherein said clovoborate salt comprises an electrolyte salt for said cell.

6. The method of claim 3 wherein said clovoborate salt comprises $Li_2B_{10}Cl_{10}$.

7. The method of claim 2 wherein said active anode metal comprises an alkali or alkaline earth metal.

8. The method of claim 7 wherein said active anode metal is lithium.

9. The method of claim 8 wherein said voltage is at least 3.5 volts.

10. The method of claim 9 wherein said porous cathode is comprised of porous carbon.

11. A method for improving the cycling life of a rechargeable non-aqueous inorganic cell comprising a lithium anode, a porous cathode, an inorganic sulfur dioxide electrolyte solvent and a clovoborate salt comprising the step of charging said cell at a voltage above 3.5 volts for at least part of the time for said charging.

12. The method of claim 11 wherein said sulfur dioxide is the sole electrolyte solvent.

13. The method of claim 12 wherein said clovoborate salt comprises the electrolyte salt for said cell.

14. The method of claim 13 wherein said clovoborate salt comprises a lithium cation and an anion having the formula $(B_mX_n)^{-k}$ wherein m, n and k are integers with m ranging from 6–20, n ranging from 6–18 and k ranging from 1–4, B is boron and X is selected from the group consisting of H, F, Cl, Br, I, OH and combinations thereof.

15. The method of claim 14 wherein said clovoborate salt comprises $Li_2B_{10}Cl_{10}$.

16. The method of claim 15 wherein said porous cathode is comprised of porous carbon.

* * * * *